(12) United States Patent
Wiese et al.

(10) Patent No.: US 11,757,145 B2
(45) Date of Patent: Sep. 12, 2023

(54) METHODS AND SYSTEMS FOR BATTERY TEMPERATURE MANAGEMENT

(71) Applicant: Ford Global Technologies, LLC, Dearborn, MI (US)

(72) Inventors: Ashley Wiese, Ann Arbor, MI (US); Angel Porras, Dearborn, MI (US); Jordan Mazaira, Taylor, MI (US); Julia Helen Buckland Seeds, Novi, MI (US); Hao Wang, Ann Arbor, MI (US); Erik Biberstein, Novi, MI (US); Gabrielle Vuylsteke, Ann Arbor, MI (US); Ashwin Hariharan, Ann Arbor, MI (US); Chenliu Stephen Lu, Northville, MI (US); Ron Razzano, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 17/449,225

(22) Filed: Sep. 28, 2021

(65) Prior Publication Data

US 2023/0099486 A1    Mar. 30, 2023

(51) Int. Cl.
| | |
|---|---|
| *H01M 10/633* | (2014.01) |
| *H01M 10/613* | (2014.01) |
| *B60L 58/26* | (2019.01) |
| *H01M 10/635* | (2014.01) |
| *H01M 10/625* | (2014.01) |
| *H01M 10/615* | (2014.01) |

(52) U.S. Cl.
CPC .......... *H01M 10/633* (2015.04); *B60L 58/26* (2019.02); *H01M 10/613* (2015.04); *H01M 10/615* (2015.04); *H01M 10/625* (2015.04); *H01M 10/635* (2015.04)

(58) Field of Classification Search
CPC ............ H01M 10/633; H01M 10/613; H01M 10/625; H01M 10/635; H01M 10/615
See application file for complete search history.

(56) References Cited

U.S. PATENT DOCUMENTS

| | | | |
|---|---|---|---|
| 10,414,240 B2 | 9/2019 | Eisele et al. | |
| 10,870,368 B2 | 12/2020 | Ing et al. | |
| 2019/0070924 A1 | 3/2019 | Mancini et al. | |
| 2020/0343601 A1* | 10/2020 | Carlson | .................. B60L 58/26 |
| 2021/0031654 A1* | 2/2021 | Vizzini | .................. B60L 58/26 |

OTHER PUBLICATIONS

Amini, M. et al., "Two-Layer Model Predictive Battery Thermal and Energy Management Optimization for Connected and Automated Electric Vehicles," Proceedings of the 57th IEEE Conference on Decision and Control (CDC), Dec. 17, 2018, Miami Beach, Florida, 6 pages.

* cited by examiner

*Primary Examiner* — Christopher P Domone
*Assistant Examiner* — Jonathan William Estes
(74) *Attorney, Agent, or Firm* — David Kelley; McCoy Russell LLP (57) ABSTRACT

Methods and systems are provided for a battery thermal management system. In one example, a method includes increasing coolant to a battery above a currently demanded battery cooling in response to a predicted battery temperature exceeding a threshold temperature at an upcoming location.

20 Claims, 5 Drawing Sheets

METHODS AND SYSTEMS FOR BATTERY TEMPERATURE MANAGEMENT

FIELD

The present description relates generally to methods and systems for adjusting coolant system operations in response to a predicted battery temperature.

BACKGROUND/SUMMARY

An increasing number of vehicles are becoming at least partially electrified to combat Climate Change. Batteries and other electrical energy storage devices may demand active cooling to keep a battery temperature below an upper threshold. During some operating conditions, the battery cooling system may not be able to maintain the battery temperature below the upper threshold, which may lead to reduced traction or accessory power. This may be increasingly prevalent in an electrified vehicle where the battery cooling system is shared with other devices.

Some examples to enhance battery operation in light of the above issues include where the battery temperature is maintained at a lower temperature throughout its operation. This may provide a sufficient buffer such that even when sustained periods of higher battery power demand are executed, the battery temperature remains below the upper threshold. The battery temperature may be maintained at lower temperatures via a combination of increased battery cooling when available (e.g., increasing coolant flow rate to the battery, opening active grille shutters, re-routing coolant to additional or different heat transfer devices such as radiator or chiller, or other actions as known in the art within a vehicle thermal management system that increase battery cooling) and reduced battery power output when sufficient cooling is unavailable or if battery heat exceeds cooling capacity.

However, the inventors herein have recognized potential issues with such systems. As one example, an electric range of a vehicle using the above approach is reduced, which in turn may increase vehicle fuel consumption. In this way, the benefits of an at least partially electrified vehicle are reduced.

In one example, the issues described above may be addressed by a method for predicting a battery temperature along an upcoming vehicle route, determining a confidence level of the predicted battery temperature, and preemptively increasing battery cooling in response to the predicted battery temperature exceeding a threshold temperature and the confidence level being greater than a threshold confidence. In this way, cooling demands at upcoming locations may be reduced, as the battery has been preemptively cooled, such that more cooling is available to other systems, which may improve customer satisfaction.

As an example, a plurality of battery temperatures may be predicted based on estimated conditions along the upcoming route or enroute to an upcoming route. The plurality of battery temperatures may be further predicted based on different heat transfers from the battery. In one example, if a battery temperature of the plurality of temperature predictions exceeds the threshold temperature, then a coolant flow to the battery may be preemptively increased to maintain the battery temperature below the threshold temperature at the upcoming location. By doing this, auxiliary systems fluidly coupled to the same coolant system may continue to receive a desired amount of coolant at the upcoming location while still maintaining the battery temperature below the threshold temperature.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
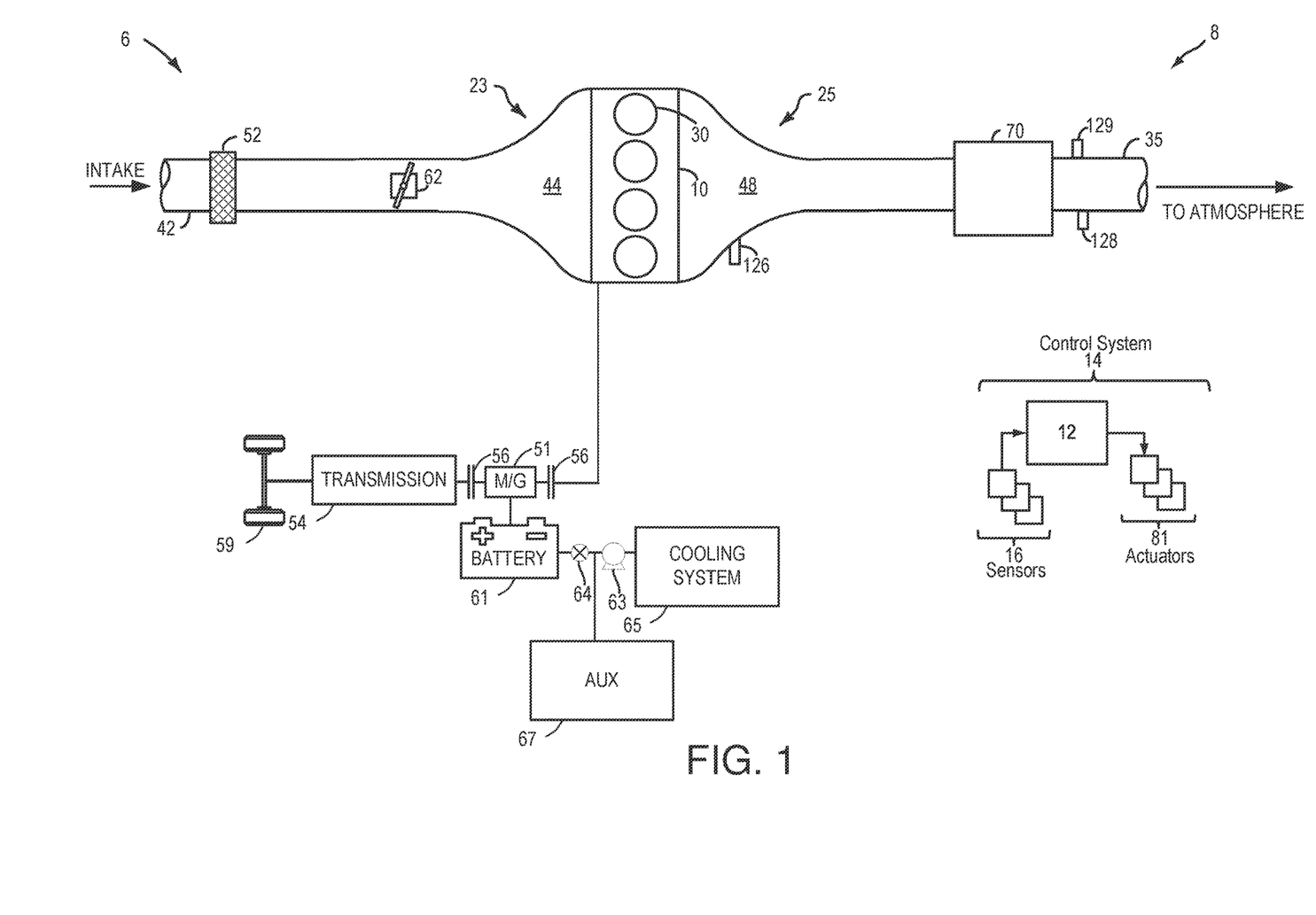
FIG. 1 illustrates a schematic of an engine included in a hybrid vehicle.
Figure 2:
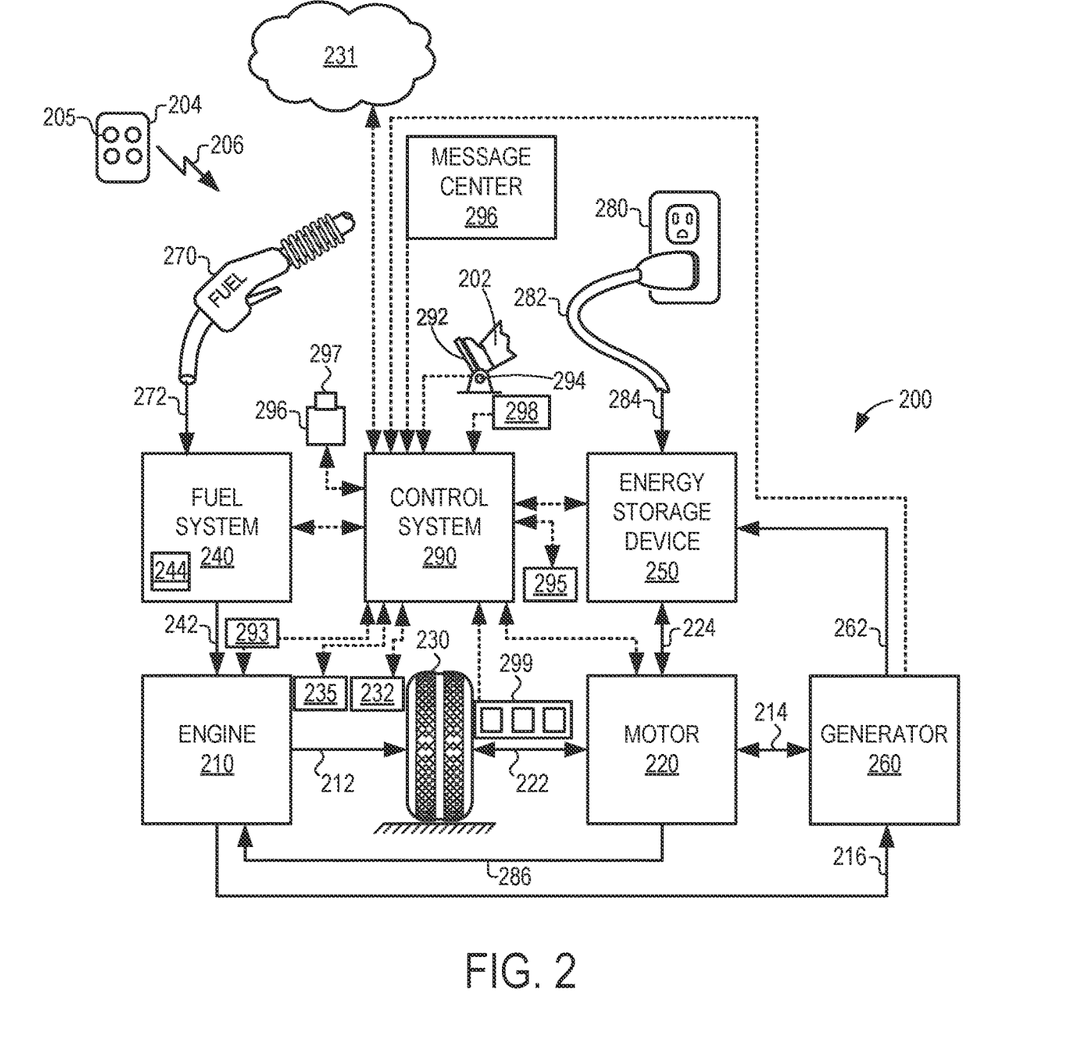
FIG. 2 schematically shows an example of a vehicle propulsion system.

The following description relates to systems and methods for battery thermal management systems. The battery thermal management systems may be included in a hybrid vehicle as illustrated in FIGS. 1 and 2. It will be appreciated that the vehicle may be configured as an all-electric vehicle without departing from the scope of the present disclosure.

Figure 3:
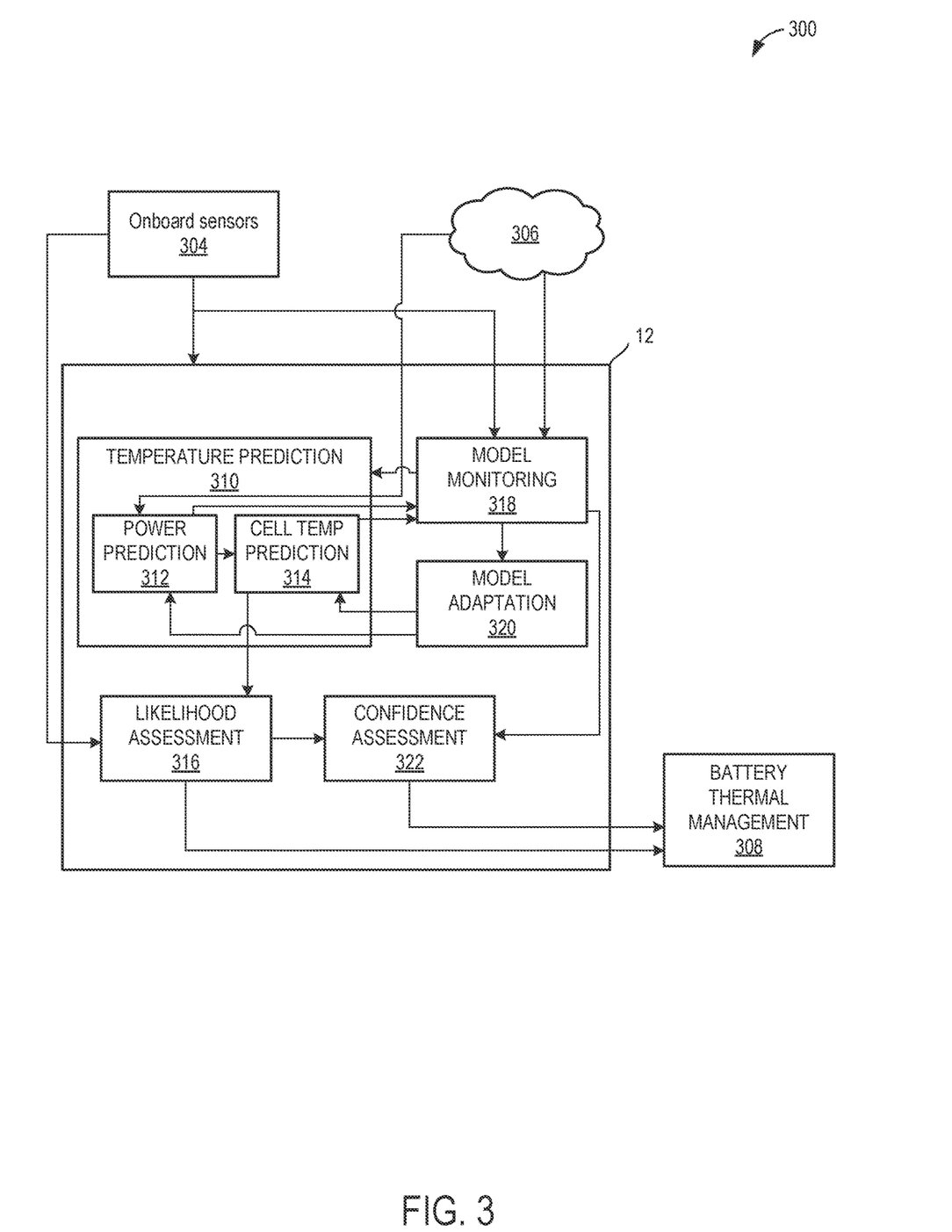
FIG. 3 illustrates an example of a battery thermal management system.
Figure 4:
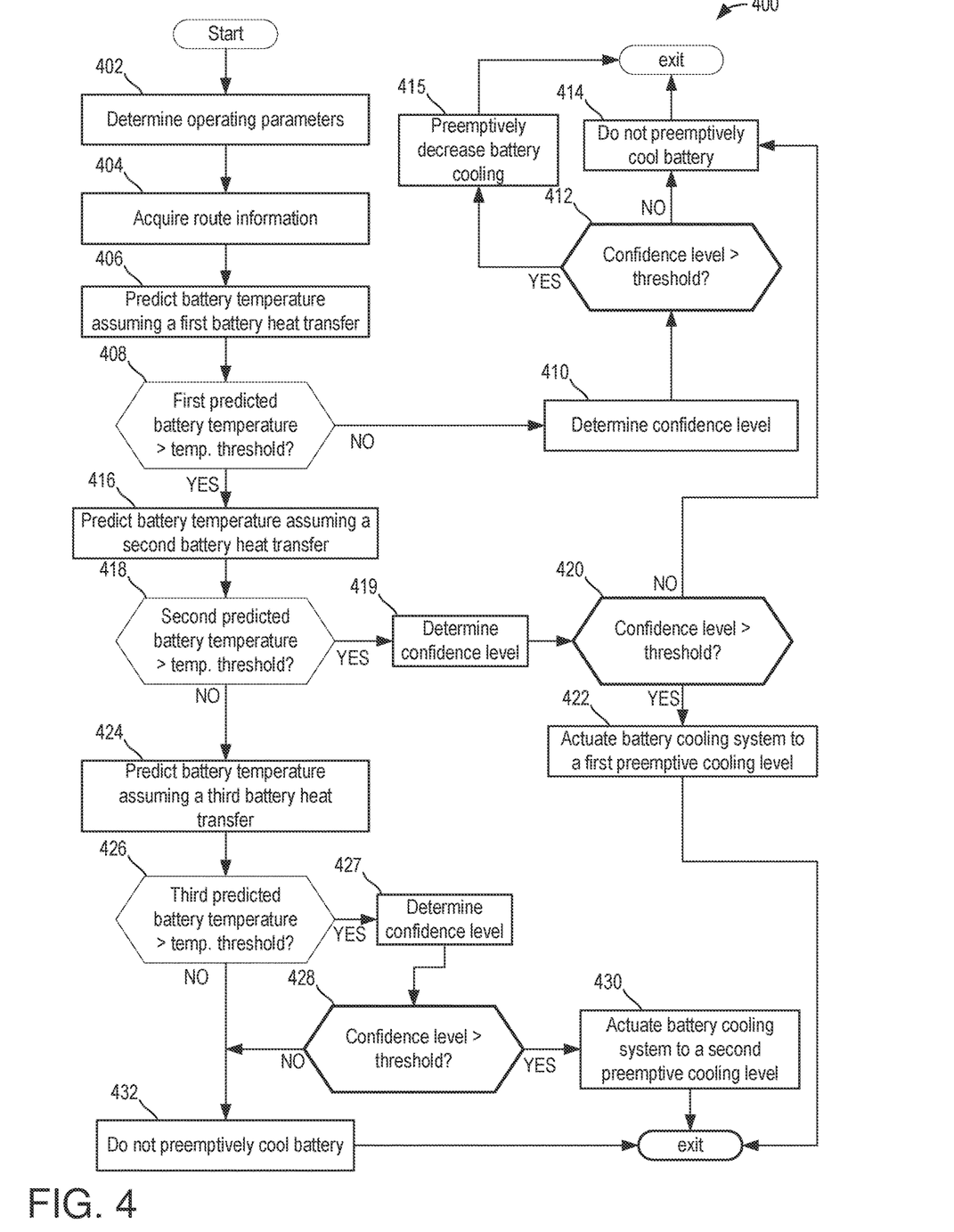
FIG. 4 illustrates a method for adjusting a coolant flow in response to a predicted battery temperature.
Figure 5:
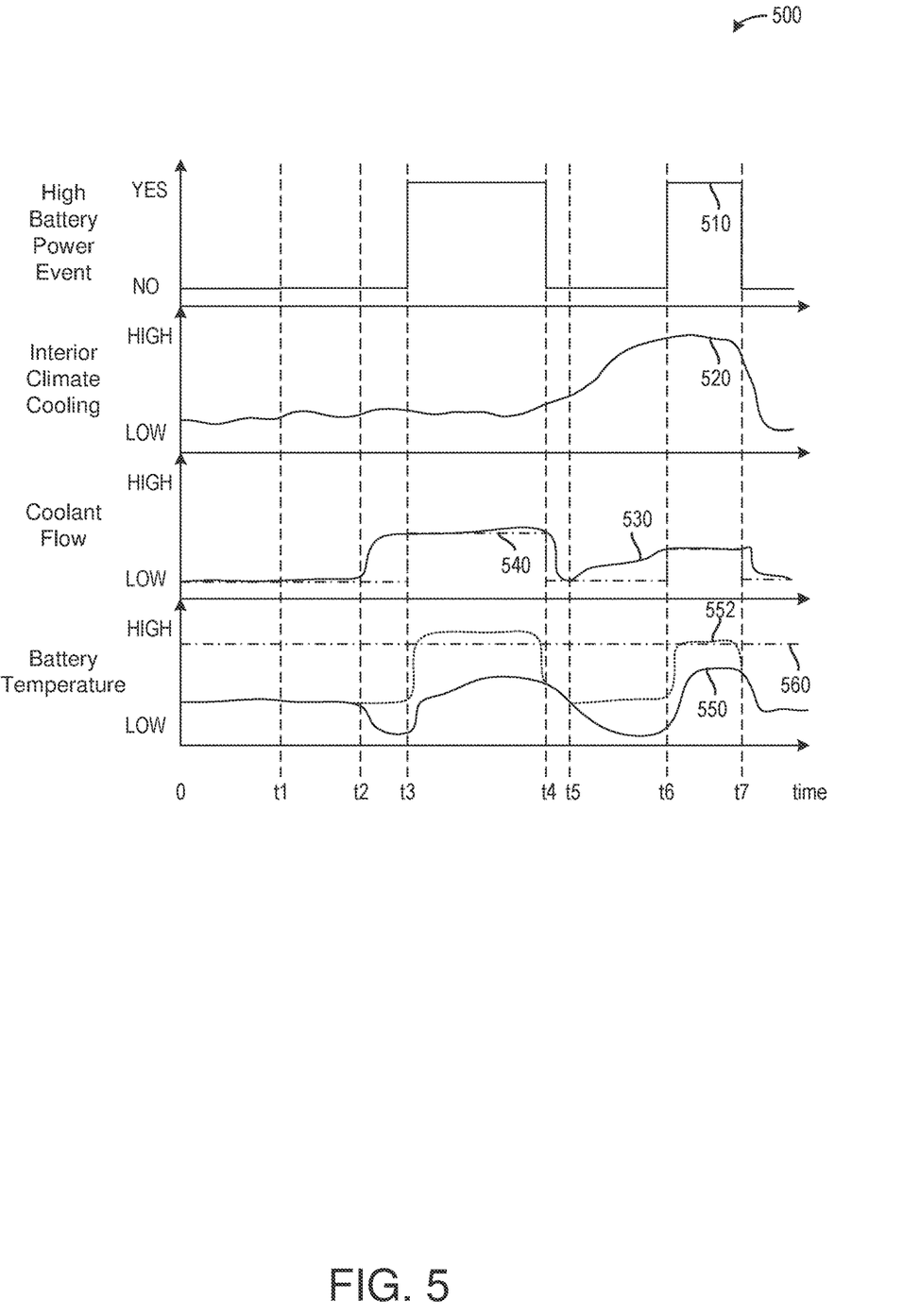
FIG. 5 illustrates an engine operating sequence graphically illustrating increasing coolant flow above a cooling demand in response to a predicted battery temperature.

An example of the battery thermal management system is illustrated in FIG. 3. The battery thermal management system may be configured to receive information from a plurality of sensors and a cloud and predict upcoming battery temperatures. The battery thermal management system may be further configured to update a battery cooling strategy based on differences between a current battery temperature and a predicted battery temperature. A method for adjusting cooling of the battery based on a cooling demand corresponding to a predicted battery temperature is shown in FIG. 4. An engine operating sequence graphically illustrating intrusively increasing cooling by increasing a coolant flow above a current cooling demand in response to a predicted battery temperature is shown in FIG. 5.

In one example, the present disclosure relates to preemptively cooling a battery in response to an estimated temperature at an upcoming location along a vehicle route. In one example, the upcoming location corresponds to a location along the vehicle route in which a vehicle is traveling toward. The preemptive cooling is executed prior to reaching the upcoming location such that the estimated temperature is maintained below a threshold temperature. By doing this, the methods and systems of the present disclosure may enhance battery operation by maintaining the battery temperature below the threshold temperature. Furthermore, this may decrease cooling demands upon reaching the upcoming location, which may free a greater amount of cooling capacity for other operations.

FIG. 1 shows a schematic depiction of a hybrid vehicle system 6 that can derive propulsion power from engine system 8 and/or an on-board energy storage device (such as battery 61). An energy conversion device, such as motor/ generator 51, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

A cooling system 65 may be fluidly coupled to the battery 61. The cooling system 65 may flow coolant to the battery 61 via a pump 63. Additionally or alternatively, a valve 64 may be arranged between the pump 63 and the battery 61. The controller 12 may be configured to adjust a position of the valve to a fully closed position, a fully open position, or a position therebetween. The controller 12 may be further configured to adjust an operation of the pump 63 to a no-flow, a low-flow, a mid-flow, or a high flow operation in response to a cooling request from the battery 61. Cooling system 65 may be coupled to cooling systems used for other purposes, such as auxiliary system 67, which may cool the passenger cabin (e.g., a vehicle interior).

In one example, the controller 12 may include instructions stored on non-transitory memory thereof that when executed enable the controller to adjust a pump setting of the pump 63 and/or a position of the valve 64. In one example, the controller may increase a setting of the pump 63 and/or move the valve 64 to a more open position in response to a predicted battery temperature being greater than a threshold temperature based on a current coolant flow. Thus, the coolant flow may be increased preemptively, before a battery coolant demand is increased. By doing this, the battery temperature may remain below the threshold temperature while still being used to propel the vehicle and/or power auxiliary devices. Additionally or alternatively, an advancing of the preemptive cooling may be further based on an auxiliary system 67 coolant demand. For example, if the auxiliary system 67, such as an air/conditioning system, is being used or predicted to be used at the locations along the upcoming route, then the preemptive cooling may be more advanced such that coolant flow to the battery is increased relative to the predicted battery temperature increase even further due to less coolant being available. Adjusting coolant flow to the battery is described in greater detail below.

FIG. 2 illustrates an example vehicle propulsion system 200 which may be used similarly to hybrid vehicle system 6 of FIG. 1. Vehicle propulsion system 200 includes a fuel burning engine 210 and a motor 220. As a non-limiting example, engine 210 comprises an internal combustion engine and motor 220 comprises an electric motor. Engine 210 may be used substantially similarly to engine 10 of FIG. 1 and motor 220 may be used similarly to electric machine 51 of FIG. 1. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 210 to be maintained in an off state (e.g., set to a deactivated state) where combustion of fuel at the engine is discontinued. For example, under select operating conditions, motor 220 may propel the vehicle via drive wheel 230 as indicated by arrow 222 while engine 210 is deactivated, which may herein be referred to as an electric-only operation.

In another example, the engine may be equipped with a start/stop (S/S) feature 293, wherein the engine 210 may be automatically shut down during times when the vehicle is not moving, or when the vehicle speed is below a threshold speed, when engine speed is below a threshold engine speed, etc. Control system 290 may be connected to engine 210 and S/S feature 293, for performing the start-stop functions. Advantages to the S/S functionality may include an improvement in fuel economy over other vehicles that do not employ such technology. During the start/stop the vehicle may be propelled via its momentum and not by the engine 210 or the motor 220.

Herein, "automatically" executing various vehicle features, such as S/S, refers to execution of the various features without vehicle operator input. That is to say, the vehicle operator does not directly signal or request the S/S or other automatic features to be executed. As such, automatic features are automatically executed in a response to current operating conditions and may not be directly signaled by the operator.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262. In some examples, the engine 210 may deactivate during regenerative braking and traction at the drive wheel 230 may be negative, such that the motor 220 may spin in reverse and recharge the energy storage device 250. Thus, regenerative braking may be distinguished from an electric-only operation, where the motor 220 may provide positive traction at the drive wheel 230, thereby decreasing a state of charge (SOC) of the energy storage device 250 while the engine 210 is deactivated.

During still other operating conditions, engine 210 may be operated by combusting fuel received from fuel system 240 as indicated by arrow 242. For example, engine 210 may be operated to propel the vehicle via drive wheel 230 as indicated by arrow 212 while motor 220 is deactivated, such as during a charge-sustaining operation. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system or a hybrid propulsion. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated by power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

In still other examples, motor 220 may be configured to rotate engine unfueled in a forward (e.g. default orientation) or reverse orientation, using energy provided via energy storage device 250, exemplified by arrow 286.

Fuel system 240 may include one or more fuel storage tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors. In some examples, increasing the electrical energy supplied from the energy storage device 250 may decrease an electric-only operation range, as will be described in greater detail below.

Control system 290 may communicate with one or more of engine 210, motor 220, fuel system 240, energy storage device 250, and generator 260. In some examples, control system 290 may be used similarly to controller 12 of FIG. 1. Control system 290 may receive sensory information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory information. In some examples, control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal. Furthermore, in some examples control system 290 may be in communication with a remote engine start receiver 295 (or transceiver) that receives wireless signals 206 from a key fob 204 having a remote start button 205. In other examples (not shown), a remote engine start may be initiated via a cellular telephone, or smartphone based system where a user's cellular telephone sends data to a server and the server communicates with the vehicle to start the engine.

In some examples, additionally or alternatively, the vehicle propulsion system 200 may be configured to operate autonomously (e.g., without a human vehicle operator). As such, the control system 290 may determine one or more desired operating engine conditions based on estimated current driving conditions.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical energy transmission cable 282 may electrically couple energy storage device 250 and power source 280. While the vehicle propulsion system is operated to propel the vehicle, electrical energy transmission cable 282 may disconnect between power source 280 and energy storage device 250. Control system 290 may identify and/or control the amount of electrical energy stored at the energy storage device, which may be referred to as the state of charge (SOC).

In other examples, electrical energy transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g. cloud), as is commonly known in the art. One example of a V2V communication device may include dedicated-short-range-communication (DSRC) network which may allow vehicles within a threshold proximity (e.g., 5,000 feet) to communicate (e.g., transfer information) free of an internet connection.

The wireless network 231 may include one or more of a database and a processor. The database may be configured to store various data provided thereto. The processor may be similar to the control system 290, wherein the processor may include memory with instructions stored thereon that allow the processor to analyze data stored in the database to determine one or more real-world conditions. The processor may then relay the outcomes to the control system 290, which may result in vehicle operating parameters being adjusted. As will be described herein, the outputs sent from the processor to the control system 290 may be used to adjust one or more battery cooling parameters, the outputs being based on information from a plurality of vehicles and other devices along the upcoming route.

Vehicle propulsion system 200 may also include an onboard navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

In some examples, vehicle propulsion system 200 may include one or more onboard cameras 235. Onboard cameras 235 may communicate photos and/or video images to control system 290, for example. Onboard cameras may in some examples be utilized to record images within a predetermined radius of the vehicle, for example. The onboard cameras 235 may be arranged on an exterior surface of the vehicle so that an area surrounding and/or adjacent to the vehicle may be visualized.

Turning now to FIG. 3, it shows an example of a battery temperature prediction system 300 for predicting a cooling demand of an energy storage device. In the example of FIG. 3, a vehicle battery temperature for a battery, such as battery 61 of FIG. 1, may be predicted using system 300. The system 300 may predict battery temperature via one or more onboard sensors 304 and/or information from a cloud 306, both of which may include a vehicle battery state of charge (SOC), weather, current cooling provided, traffic, miles remaining on a trip, predicted vehicle speed and grade, and the like which may be measured via one or more sensors such as a voltage sensor, a GPS sensor, a temperature sensor, a proximity sensor, photodiode, and the like. The vehicle battery temperature prediction may be calculated based on inputs provided to the controller 12 and model monitoring module 318. A battery thermal management system 308, which, in one example, includes the pump 63 and the valve 64 of FIG. 1, may receive a signal from the controller, such as the controller adjusting actuators of the battery thermal management system 308, based on the battery temperature predictions.

In some examples, additionally or alternatively, the system 300 may be used to predict temperatures of components other than the battery system. For example, the system 300 may be used to predict an engine temperature, a transmission temperature, a turbocharger temperature, a supercharger temperature, an auxiliary motor temperature, and the like. In this way, the system 300 may be used to predict temperatures of components with cooling demands and/or coupled to a cooling system.

The vehicle controller may identify a change in cooling demand along a route using the following functionality which will be discussed in greater detail below: a battery temperature prediction module 310, a likelihood assessment module 316, a model monitoring module 318, a model adaptation module 320, and a confidence assessment module 322. Route information may be obtained by a navigation system (e.g., GPS), historical data, an application from a mobile phone or other device that may be connected to the vehicle, and the like.

In one example, the system 300 may be configured to estimate a confidence assessment using confidence assessment module 322 in combination with a likelihood assessment from likelihood assessment module 316 regarding a magnitude of a cooling demand based on predicted conditions. Controller 12 may adjust actuators of the battery thermal management system 308 based on a predicted cooling demand. In one example, if the predicted cooling demand is relatively high, then the controller 12 may signal to a coolant pump (e.g., pump 63 of FIG. 1) to increase coolant flow to the battery. Additionally or alternatively, a battery coolant valve (e.g., valve 64 of FIG. 1) may be actuated by the controller to a more open position in response to the predicted cooling demand being higher than a current demand. The controller preemptively adjusting actuators of the battery thermal management system as a result of predicting battery cooling demand may reduce degradation of the battery due to overheating due to upcoming high cooling demand events while also allowing coolant to flow to other components. Additionally or alternatively, the prediction may cause the controller to reduce a duty load of the coolant pump if the predicted cooling demand is lower than a current cooling demand.

A portion of a battery temperature prediction may be estimated via the battery temperature prediction module 310 of controller 12 using inputs from the cloud network 306, onboard sensors 304, and the model monitoring module 318, wherein the inputs may include one or more of driver behavior, predicted vehicle speed, predicted road grade, location, traffic congestion, and weather as a result of data from connected vehicles and/or connected infrastructure communicating with cloud network 306. In one example, onboard sensors 304 may correspond to feedback from one or more sensors of the vehicle, such as sensors 16 of FIG. 1. For example, the battery temperature prediction may increase if the vehicle is expected to drive in direct sunlight. As another example, the battery temperature prediction may decrease if expected driver demand is low or if an ambient temperature forecast is low. Battery temperature prediction module 310 may include a battery power prediction module 312 and a battery cell temperature prediction module 314. Data from onboard sensors 304 and cloud network 306 may be used by battery power prediction module 312 to predict a vehicle battery power along a route. In one example, a vehicle may be operated along a route along which other similar vehicles have traveled. Other similar vehicles may include one or more similarities to the vehicle, including but not limited to one or more of make, model, manufacture data, manufacture location, driver age, driver sex, number of occupants, battery age, maintenance history, and the like. Data from cloud network 306 may be based on similarities between the vehicle and other vehicles traveling the same route. The battery cell temperature prediction module 314 may then receive a power prediction from the power prediction module 312 along with feedback from the model adaptation module 320, which may include data regarding a current battery cooling.

Battery cell temperature prediction module 314 may use an onboard battery thermal model, which may calculate a battery cell temperature prediction using the battery power predictions from battery power prediction module 312 along with a plurality of measurements provided by onboard sensors 304, including but not limited to a current cooling state, coolant flow, coolant temperature, cooling demands, ambient temperature, and related component temperatures. The onboard battery thermal model may include a plurality of models including a resistor-capacitor (RC) circuit model and a lumped thermal mass model. The RC circuit model may predict battery heat generation from a predicted battery current, provided by a battery power to battery current calculation facilitated by battery power prediction module 312. The lumped thermal mass model may predict an average temperature of components of the vehicle battery, including a battery cell and a battery case. The lumped thermal mass model may use heat generation values provided by the RC circuit model to calculate predicted battery temperature by accounting for heat transfer between components, such as heat transfer between the battery case and battery coolant, battery cells and the battery case, and the battery case and ambient atmosphere.

The battery cell temperature predictions from battery cell temperature prediction module 314 may be used in likelihood assessment module 316. The lumped thermal mass model may calculate the battery cell temperature predictions using a plurality of heat transfer magnitudes between the battery case and the battery coolant. The levels of constant heat transfer may be modifiable values based on historical data of battery cooling operations from a local and/or connected vehicle system. The levels of constant heat transfer may further be functions of vehicle system parameters and/or environmental conditions. In one example, the vehicle may initialize default values for the levels of constant heat transfer set by manufacturers upon initial operation. In one example, the levels of constant heat transfer may be lowered as a weather prediction indicates an increase of ambient temperature along a route, as this may lead to a higher demand of vehicle operator cooling, which may reduce a cooling capacity for cooling the battery in a coupled cooling system.

A likelihood of a change in cooling demand may be calculated by the likelihood assessment module 316.

The likelihood of a change in cooling demand, including a high demand battery cooling event, may be determined by comparing the battery cell temperature predictions along a predicted route to modifiable thresholds given the magnitudes of heat transfer between the battery and battery coolant. The battery cell temperature predictions may include the levels of constant heat transfer from the battery case to the battery coolant. In one example, the likelihood of a change in cooling demand occurring may be determined without information about heat transfer between the battery and battery coolant. In one example, a singular threshold partitioning normal and high predicted battery cell temperatures may be used to assess changes in cooling demand. If the battery cell temperature predictions do not exceed the threshold, a high demand battery cooling event may not be predicted to occur, the battery thermal management system 308 may adjust operations to preemptively lower the predicted cooling demand to save energy. In one example, the battery cell temperature prediction may exceed the threshold with an assumption of high heat transfer between the battery and battery coolant, indicating a likelihood of a high demand battery cooling event occurring, so the battery thermal management system 308 may adjust operations to preemptively accommodate the predicted cooling demand. Given multiple levels of constant heat transfer, battery thermal management system 308 may adjust operations to accommodate preemptive cooling adjustments at varying times, depending on the magnitude of assumed heat transfer and if the battery cell temperature prediction exceeds the threshold. In one example, if the battery cell temperature prediction exceeds the threshold, battery thermal management system 308 may adjust operations to accommodate preemptive cooling at an earlier time for a higher magnitude of heat transfer compared to a time for a lower magnitude of heat transfer. In one example, battery thermal management system 308 may adjust operation to accommodate preemptive cooling at a fixed time before the predicted high demand cooling event occurs for any magnitude of heat transfer.

Monitoring and maintaining predictions may improve accuracy of future predictions when a plurality of variable conditions may be presented during vehicle operation. FIG. 3 illustrates an approach that compares predictions to observations as they become available. In alternate embodiments, predictions may be compared to observations at fixed intervals of time (e.g., 5 minutes, 10 minutes, 30 minutes). Accuracy metrics of predictions calculated using system 300 may be calculated using model monitoring module 318 from the comparisons of predictions to observations and may be communicated to model adaptation module 320 and confidence assessment module 322. A new prediction for battery power, battery cell temperature, and the like may be requested when an absolute value of a difference between an active prediction magnitude and an observation magnitude exceeds a threshold. In one example, observed battery cell temperatures may be compared to battery cell temperature predictions at regular intervals of time (e.g., 5 minutes, 10 minutes). In one example, new predictions may be requested after an amount of time has passed (e.g., 5 minutes) regardless of prediction values and observed values.

In one example where three levels of constant heat transfer between the battery and battery coolant are used for likelihood assessment of a change in cooling demand occurring, battery cell temperature prediction values may be normalized by model monitoring module 318 using three battery cell temperature predictions, one prediction for each level of constant heat transfer, such that a comparison between an observed battery cell temperature and a predicted battery cell temperature may be more accurate than traditional approaches with respect to the three levels of constant heat transfer. In one example, given an observed level of heat transfer between the battery and battery coolant measured by a sensor, where the observed level of heat transfer is between two threshold levels of heat transfer, a normalized battery cell temperature prediction at a future instance may be calculated via equation 1 below.

$$T_{cell}^{norm}(k+1) = T_{cell}^{norm}(k) + (1-\alpha)(T_{cell}^1(k+1) - T_{cell}^2(k+1) - T_{cell}^2(k)) \qquad (1)$$

The value $\alpha$ may be calculated via equation 2 below.

$$\alpha = \frac{Q_{chill}^{obs} - Q_{chill}^1}{Q_{chill}^2 - Q_{chill}^1} \qquad (2)$$

In equation (1), $T_{cell}^{norm}(k)$ represents a normalized battery cell temperature prediction at a time k. In one example, k represents a present time. $T_{cell}^{norm}(k+1)$ represents a normalized battery cell temperature prediction one increment of time (e.g., 1 minute) after the normalized battery cell temperature prediction at time k. $T_{cell}^1(k+1)$ represents a battery cell temperature prediction one increment of time after time k assuming a heat transfer magnitude between the battery case and battery coolant at a first threshold. $T_{cell}^2(k+1)$ represents a battery cell temperature prediction one increment of time after time k assuming a heat transfer magnitude between the battery case and battery coolant at a second threshold. $T_{cell}^2(k)$ represents a battery cell temperature prediction at time k assuming a heat transfer magnitude between the battery case and battery coolant at the second threshold. In equation (2), $Q_{chill}^{obs}$ represents an observed magnitude of heat transfer between the battery case and battery coolant. $Q_{chill}^1$ represents a first threshold of heat transfer between the battery case and battery coolant. $Q_{chill}^2$ represents a second threshold of heat transfer between the battery case and battery coolant. In one example, the first threshold may be a lesser magnitude than the second threshold such that the observed magnitude of heat transfer is greater than the first threshold and less than the second threshold.

Model monitoring module 318 may request updated predictions from cloud network 306 if an absolute value of a difference between a present prediction and an observation exceeds a modifiable variance threshold. Cloud network 306 may provide a plurality of data to model monitoring module 318 including updated route information and updated prediction models taking current observational data into consideration. Calls to cloud network 306 may include providing data from model monitoring module 318 such as battery case temperature, battery SOC, and remaining route distance.

In alternate embodiments of FIG. 3, assessing battery thermal model accuracy for predictions may include simulating the battery thermal model using vehicle observations as inputs and boundary conditions. Outputs from simulating the battery thermal model may be compared to a corresponding plurality of outputs from real observations of the battery thermal model in a local vehicle. If an absolute value of a difference between simulated model outputs and local vehicle observational outputs exceeds a threshold, model monitoring module 318 may request updated predictions from cloud network 306.

Model adaptation module 320 may update model parameters from model monitoring module 318 to account for metric variability among models in a connected vehicle population, including but not limited to changes in data as a vehicle ages and hardware variations. Model parameters may be learned over time to reduce an absolute value of difference between model predictions and local vehicle observational outputs.

Vehicle operator behavior (e.g., aggressiveness, interior climate preferences) may influence a usage of battery power, resulting in changes to battery temperature. Vehicle operator behavior may affect battery temperature predictions in combination with and/or separately from a distance remaining on a current route or an upcoming route. Model parameters may be adapted as a function of vehicle operator behavior. In one example, if multiple vehicle operators use the vehicle, then model parameters may be updated based on vehicle operator behavior such that each model of the models reflects each individual vehicle operator behavior. In one example, if a vehicle operator behavior includes more aggressive driving (e.g., harder accelerations), then model parameters may be updated to adjust the power prediction 312 based on the increased power demand due to aggressive driving behaviors. In one example, aggressive driving behaviors may include hard tip-ins, late brake timing, and the like. Hard tip-ins may include where the accelerator pedal is depressed more quickly than soft tip-ins associated with less aggressive driving behaviors.

Confidence assessment module 322 may take in influencing factors from likelihood assessment module 316 and model monitoring module 318, including but not limited to prediction accuracy metrics, time and/or distance to identified changes in cooling demand (e.g., high demand battery cooling events or no cooling demand events), and statistical metrics from cloud network 306. An output of the confidence assessment module 322 may prompt the controller 12 to adjust battery thermal management system 308 depending on the magnitude of variance between outputs from likelihood assessment module 316 and model monitoring module 318.

A confidence assessment rating may increase as a modifiable function of decreasing distance and/or time until a predicted change in cooling demand occurs. In one example, the confidence assessment rating may increase (e.g., linearly, exponentially, logarithmically) as distance/time to a predicted change in cooling demand decreases. Predictions calculated in close proximity to the present location and time of a vehicle may be more accurate than predictions calculated farther into the future.

A confidence rating for a given likelihood assessment from likelihood assessment module 316 may vary according to differences between predictions and observations provided by model monitoring module 318. The confidence rating may be adjusted as a result of a modifiable function of a magnitude of variance between predictions and observations provided by model monitoring module 318.

Confidence assessment module 322 may include where an increase in magnitude of variance between predictions and observations may increase confidence ratings for a likelihood assessment provided by likelihood assessment module 316. If a battery thermal prediction model predicts lower temperatures than observed temperatures and an increase in cooling demand is not identified to occur, confidence ratings may decrease. If a battery thermal prediction model predicts lower temperatures than observed temperatures and a decrease in cooling demand is identified to occur, confidence ratings may increase. If a battery thermal prediction model predicts higher temperatures than observed temperatures and an increase in cooling demand is not identified to occur, confidence ratings may increase. If a battery thermal prediction model predicts higher temperatures than observed temperatures and a decrease in cooling demand is identified to occur, confidence ratings may decrease.

Thus, in one example, the example of FIG. 3 illustrates an example of a system configured to predict a battery temperature along a vehicle journey. In one example, the vehicle journey includes a route traveled from a starting point of the vehicle journey to an end point of the vehicle journey. The route of the vehicle journey may be predicted based on historical data stored in memory of the controller or uploaded to the cloud based on previous journeys completed, wherein previous journeys may be matched to a current journey based on time of day, vehicle operator identity, location, and the like. For example, if a vehicle is started at 8:00 AM on a Monday in a vehicle driveway, then a current journey may be matched to a previous journey that includes where the vehicle also started at a similar time and location. Additionally or alternatively, the route may be provided by the vehicle operator via the navigation system, a mobile device, or the like.

Battery temperature predictions may be executed based on previous battery temperatures achieved during previous similar journeys. Similar journeys may be characterized as being similar based on one or more of weather, route segments, power output, and miles driven. For example, a first journey travelled during summer months may not be matched to a second journey travelled during winter months, even if the segments of the first and second journeys are identical. The battery temperature predictions may be further executed based on other data, such as weather, cooling demands, traffic congestion, vehicle maintenance, and other conditions as described above. For example, if an ambient temperature is lower during the current journey compared to the previous journey, then the battery temperature predictions may be reduced relative to the previous journey based on a difference in current ambient temperatures. In this way, cloud data from cloud network 306 and onboard sensors 304 may be used in combination to execute a temperature prediction at battery temperature prediction module 310.

The battery temperature prediction module 310 may include a power prediction module 312, wherein the power prediction module 312 may receive inputs from the onboard sensors 304 and the cloud 306. The power prediction module 312 may be adjusted based on one or more of driver behavior and weather. For a vehicle with multiple vehicle operators, parameters for executing the power prediction module 312 may be customized for each individual vehicle operator, thereby providing more accurate power prediction estimates for the current journey. Customization may include vehicle operator aggressiveness along with cabin heating/cooling demands, auxiliary power demands, and the like. By receiving data from onboard sensors 304 and from the cloud 306, historical data may be used to preemptively execute the power prediction module 312 while the power prediction module may be further configured to predict power usage in real-time.

For example, the power prediction module 312 may predict power usage for an entirety of the current journey upon matching the current journey to a previous journey. As the vehicle travels along the route of the current journey, the power prediction module 312 may update power predictions in real-time based driver behavior, climate, and the like. The adjustments to the power predictions may be sent to the model monitoring module 318, wherein parameters thereof may be updated based on the updated predictions.

The power predictions may be input to the cell temperature prediction module, wherein battery cell temperatures based on the power predictions may be predicted for the current journey. In one example, segments of the current journey where power prediction are higher may include higher battery cell temperature predictions. Additionally or alternatively, segments of the current journey where sun exposure is higher may include higher battery cell temperature predictions.

The battery cell temperature prediction may include the RC circuit model and the lumped thermal mass model. The lumped thermal mass model may include calculating an average temperature of one or more subcomponents of the battery, such as a battery cell and a battery case. The average temperatures calculated for the one or more subcomponents may further account for thermal transfer between the subcomponents and coolant. In one example, the average temperatures calculated are calculated with different coolant flows flowing thereto for the various upcoming segments of the current journey. The different coolant flows may be variable flows or may be one or more fixed flows. The one or more fixed flows may include a no-flow, a low-flow, a medium-flow, and a high-flow, each based on more commonly used cooling settings during vehicle operation. In one example, heat transfer rates of the different coolant flows may be decreased as an ambient temperature prediction or a sun exposure prediction along the current journey increases. In one example, as the ambient temperature prediction and/or the sun exposure prediction increases, a climate load of the battery system may increase, thereby decreasing a cooling capacity available for battery cooling in systems with multi-use cooling systems (e.g., battery cooling and cabin cooling coupled to a single cooling system).

To enhance a robustness of the battery cell temperature prediction, the model monitoring module 318, the model adaptation module 320, and the confidence assessment module 322 may be used to update and assess various feature of the battery cell temperature prediction module 314. For example, battery cell temperatures sensed in real-time may be compared to a battery cell temperature prediction at a same location, wherein differences between the values may result in updates to the battery cell temperature prediction module 314 via feedback from the model adaptation 320. In one example, only differences outside of an updating threshold may be used to update parameters. In one example, the updating threshold may be a dynamic threshold based on a non-zero, positive number. In one example, the updating threshold may differ for the various battery cell temperature predictions based on coolant flow. For example, the updating threshold may be a range of an actual value observed, wherein the range may be smaller during conditions where high cooling is desired and larger when low cooling is desired. In this way, high cooling conditions may include where parameters are updated more frequently or fine-tuned to a higher degree of accuracy to provide a desired amount of cooling while also mitigating degradation to the battery. In some examples, additionally or alternatively, updating may be blocked if the current journey deviates from the predicted journey, wherein observed data may be sent to the cloud along with a request to update the predicted journey to predict the route of the current journey.

In one example, the controller 12 may compare the model monitoring module output (e.g., the predicted conditions of the current journey) to the actual conditions of the current journey, wherein differences exceeding the updating threshold may be sent to the model adaptation module 320, wherein updates to the battery temperature prediction module 310 may occur. This may result in updated model monitoring parameters for the current journey, along with an updated prediction.

The likelihood assessment module 316 may determine if a likelihood of cooling demands changing. In one example, the likelihood is based on a threshold risk. The threshold risk may be a non-zero, positive number, that depends on proximity to the threshold given the level of assumed heat transfer.

Turning now to FIG. 4, it shows a method 400 for assessing a likelihood of a change in cooling demand. Instructions for carrying out method 400 may be executed by a controller, such as the controller 12 of FIG. 1, based on instructions stored on a memory of the controller and in conjunction with signals received from sensors of the vehicle system, such as the sensors described above with reference to FIG. 1. The controller may employ actuators of the thermal management system to adjust system operation, according to the method described below.

At 402, the method 400 includes determining current operating parameters. Current operating parameters may include but are not limited to one or more of a battery temperature, an ambient temperature, a vehicle speed, a battery SOC, and a battery voltage.

At 404, the method 400 may include acquiring route information. The route of a vehicle journey may be predicted based on historical data stored in memory of the controller or stored in a database of the cloud based on previous journeys uploaded, wherein previous journeys may be matched to a current journey based on time of day, vehicle operator identity, location, weather, and the like. Additionally or alternatively, the route may be provided directly by the vehicle operator via the navigation system, mobile device, or other similar device.

At 406, the method 400 may include predicting a first battery temperature assuming a first battery heat transfer. In one example, the first battery heat transfer corresponds to a condition where heat transfer between components, such as heat transfer between the battery case and battery coolant, does not occur or occurs at a minimal rate. The predicted battery temperature may be affected by a plurality of factors, including but not limited to battery power output, ambient temperature, sun load, wind speeds, and rain/snow along with a current battery temperature. For example, as sun load increases, then the predicted battery temperature may increase. As ambient temperature decreases, then the predicted battery temperature may decrease. Battery temperature may be predicted using models described above with respect to FIG. 3. By predicting the battery temperature with no heat transfer, it may be determined if cooling is desired.

At 408, the method 400 may include comparing the first predicted battery temperature to a threshold temperature. In one example, the threshold temperature is customizable based on modules in the controller, such as the battery temperature prediction module of FIG. 3. The threshold temperature may be based on a non-zero, positive number. In one example, the threshold temperature corresponds to an upper temperature of the battery, wherein operation of the battery at the upper temperature may decrease battery power output and/or increase a likelihood of degradation.

If the first predicted battery temperature is not predicted to be greater than the threshold temperature (e.g., less than or equal to the temperature threshold), then the method 400 may include determining a confidence level at 410. The confidence level may include a prediction accuracy and other influencing factors to determine a reliability of the predicted battery temperature. In one example, the confidence level may be based on a time/distance to a location corresponding to the prediction, magnitude of the temperature increase, accuracy metrics for the model monitoring, and statistical metrics for cloud signals. Additionally or alternatively, the confidence level may be based on, a difference between the predicted battery temperature and the threshold temperature, a difference between a predicted and observed vehicle position, a difference between predicted and observed battery power, a difference between battery coolant temperature at the inlet and battery coolant temperature at the outlet and a difference between predicted and observed battery temperature. An observed metric corresponds to a metric sensed or determined during a current vehicle operation.

In one example, the time/distance to the location may include uncertainty in forecasting traffic flow, weather, and the like. Thus, predictions further into the future may be less accurate, and therefore include a lower confidence level than predictions in the near future. For example, a predicted battery temperature for a location 1 mile away may include a higher confidence level than a predicted battery temperature for a location 20 miles away. In one example, the confidence level may increase as a function of decreasing distance and/or time.

In some examples, the predictions may be executed based on a threshold forecasting. The threshold forecasting may be based on an amount of time, a remaining distance, and the like. For example, prediction may only predict one minute in advance of a current vehicle position based on the threshold forecasting. Additionally or alternatively, the threshold forecasting may predict 5000 meters (m), 2500 m, 1000 m, or fewer in advance of a current vehicle position. As such, the threshold forecasting may limit a time or distance into the future in which the prediction may predict battery conditions. By doing this, a prediction accuracy, and confidence thereof, may increase.

In one example, the magnitude of the temperature increase may correspond with a severity of the prediction. That is to say, if the temperature increase is relatively high, then a severity of the prediction, which corresponds to an amount of cooling that will be demanded to maintain the battery temperature below the threshold temperature, will also be high. The amount of cooling may be based on one or more of a coolant temperature and flow rate, as determined by one or more of a pump speed, a valve position, a compressor speed, an active grill shutter position, and a fan speed.

Table 1 below illustrates a relationship between confidence adjustment and temperature prediction.

TABLE 1

Confidence Rating Adjustment by Segment for a Given Prediction Error Direction

|  | No identified thermal increase | Identified thermal increase |
|---|---|---|
| Battery thermal prediction is underpredicting temperatures | Decrease confidence | Increase confidence |
| Battery thermal prediction overpredicting temperatures | Increase confidence | Decrease confidence |

Overall, an increase in error prediction may decrease a confidence level. However, as shown in the Table 1, a thermal increase may be more likely to be true if battery temperature predictions are predicting lower than actual battery temperatures. Thus, if battery temperature predictions are overpredicting temperature, then a corresponding predicted thermal increase may include a lower confidence level.

In one example, accuracy metrics for the model monitoring may include learned model adaptations. For example, the confidence level may be reduced if the model parameters have not been updated recently. Additionally or alternatively, the confidence level may increase if the model parameters have been updated recently. In one example, model parameters being updated may include parameters related to driver behavior and interior climate preferences. These parameters may affect battery power usage and therefore battery temperatures. Thus, customized parameters may be stored for individual vehicle operators of the vehicle. If a vehicle operator behavior is unknown, then an associated confidence level may be relatively low for predicted battery temperatures. In one example, driver behavior and climate preferences may be updated on a pre-drive basis (e.g., updated each vehicle journey). In one example, observing a higher than expected driver aggressiveness may increase the predicted battery temperature, wherein a confidence associated with the prediction may not be changed.

In some examples, additionally or alternatively, if vehicle operator behavior is unknown, then behaviors may be retrieved from a cloud, wherein an average behavior may be used. The average behavior may be based on vehicle operator behavior through locations similar or identical to the upcoming location. A location may be similar to the upcoming location based on one or more of a road grade, a speed limit, a traffic congestion, and the like.

In one example, statistical metrics for cloud signals which may include data used to predict a battery power estimate or a battery temperature may be based on data for which statistical variance is known. The confidence level may be adjusted based on the variance of the data for a portion and/or a location of the vehicle journey corresponding to the predicted battery temperature. Higher variance may decrease the confidence level and lower variance may increase the confidence level. In one example, higher variance may include where a plurality of similar cars travels through the portion and/or the location of the vehicle journey with a range of battery temperatures differing from one another by greater than a threshold difference (e.g., 20%, or 15%, or 10%). Thus, the battery temperature prediction may include a lower confidence rating if variability is high.

At 412, the method 400 may include determining if the confidence level is greater than a threshold confidence. In one example, the threshold confidence may be based on a customizable confidence setting, wherein confidence levels below the threshold confidence may result in a request to repeat the battery temperature prediction (e.g., NO at 412). In one example, the threshold confidence may be a high confidence, a medium confidence, or a low confidence, wherein the medium confidence is less than the high confidence and greater than the low confidence.

At 414, the method 400 may include not preemptively increasing or decreasing battery cooling. As such, the battery temperature may be maintained without preemptively increasing or decreasing a battery cooling than a current desired battery cooling demand. Thus, the current battery cooling may meet a current demand. In one example, the battery cooling may correspond to a coolant flow rate expressed in volume over time or mass over time. Additionally or alternatively, the current battery cooling may further include a grille position. The grille position may include a fully closed position, a fully open position, and a plurality of positions therebetween. The fully open position may correspond to a highest cooling of the battery and the fully closed position may correspond to a lowest cooling of the battery.

If the current battery cooling demand is non-zero, the method 400 at 415 may include preemptively reducing or disabling cooling. As such, the battery temperature may be maintained by preemptively decreasing a battery cooling less than a current desired battery cooling demand. Thus, the battery temperature may be maintained with less energy usage. In one example, reducing the battery cooling may correspond to lowering a coolant flow rate.

In some examples, heating the battery may occur at 415. Heating the battery may include reducing a fan speed, actuating active grille shutters to a more closed or fully closed position, and/or reducing the coolant flow. Based on a comparison of the battery temperature and the coolant temperature, coolant flow to the battery may increase if the coolant temperature is greater than the battery temperature. Additionally or alternatively, hotter coolant, such as an engine coolant or coolant heated by a heating device, may flow to the battery.

Returning to 408, if the first predicted battery temperature is greater than the temperature threshold, then it may be predicted that cooling will be desired. At 416, the method 400 includes predicting a second battery temperature with a second battery heat transfer. In one example, the second battery heat transfer may be a relatively high battery heat transfer. In one example, the second battery heat transfer corresponds to a highest cooling available to the battery.

At 418, the method 400 may include determining if the second predicted battery temperature is greater than the threshold temperature. If the second predicted battery temperature is predicted to exceed the temperature threshold, then it may be determined that a combination of upcoming conditions including but not limited to weather and power output may result in the battery temperature exceeding the threshold temperature even if a relatively high amount of cooling is provided thereto.

If the second predicted battery temperature is greater than the threshold temperature, then preemptive cooling may be desired so that a cooling demand at an upcoming location where the battery temperature is expected to exceed the threshold temperature may be lower than a cooling demand with no preemptive battery cooling.

At 419, the method 400 may include determining a confidence level, similar to 410 described above.

At 420, the method 400 may include comparing the confidence level to the threshold confidence level, similar to 412 described above.

At 422, the method 400 may include actuating the battery cooling system via the controller to a first preemptive cooling level if the confidence level is determined to be above the threshold confidence level at 420. Thus, the cooling is increased at a location prior to the upcoming location at which the battery temperature is predicted to exceed the threshold temperature. In one example, the first preemptive cooling corresponds to a coolant flow rate greater than a currently demanded coolant flow rate. Additionally or alternatively, grille shutters may be moved to a more open position during the first preemptive cooling. In some examples, additionally or alternatively, a fan speed may be adjusted to an increased fan speed. Additionally or alternatively, a temperature of the coolant may be reduced prior to flowing the coolant to the battery. In one example, the coolant may flow through additional heat exchangers or the like. By cooling the battery in advance, an amount of coolant desired at the upcoming location at which the battery temperature is predicted to exceed the threshold temperature may be lower than in examples where preemptive cooling is not used. In one example, a pump and/or a valve may be actuated by the controller to flow more coolant to the battery prior to reaching the upcoming location. For example, the controller may signal to an actuator of the pump (e.g., pump 63 of FIG. 1) to intrusively pump more coolant than currently requested to the battery at a current location before the vehicle reaches the upcoming location at which the estimated temperature exceeds the threshold temperature. Furthermore, the controller may signal to an actuator of an active grille system to adjust grilles to a more open position, relative to a current position, to provide a greater amount of air flow to a radiator and/or the battery.

In one example, an advancing of the preemptive cooling may be based on current cooling demands. For example, if an interior climate demand is relatively high (e.g., A/C compressor speed is high), then current coolant demands may be high and less coolant may be available for cooling the battery. In one example, to maintain a customer satisfaction, the preemptive cooling may be further advanced, while the first preemptive cooling level may be reduced. By doing this, a starting temperature of the battery at the location where the battery temperature is predicted to exceed the threshold temperature may be equal to using a less advanced, higher preemptive cooling. Additionally or alternatively, to continue meeting the interior climate demand, a balance of the coolant flow and the grille shutter position may be biased, such that the grille shutter position is moved to a more open position prior to increasing the coolant flow rate. That is to say, the method may include maximizing cooling via the grille shutters to meet an upcoming cooling demand when an A/C compressor speed is high or when coolant demands at other components is high.

Returning to 418, if the second battery temperature is not predicted to exceed the temperature threshold (e.g., less than or equal to the temperature threshold), then a cooling demand at an upcoming location correspond to the predicted battery temperature may be between a relatively high cooling level and a relatively low cooling demand. In one example, the relatively low cooling demand is equal to zero.

At 424, the method 400 may include predicting a third battery temperature assuming a third heat transfer. In one example, the third heat transfer may be between the first heat transfer and the second heat transfer. In one example, the third heat transfer is more similar to the second heat transfer than the first heat transfer. As such, the third heat transfer may correspond to heat transfer between 50 to 100% heat transfer from the battery.

At 426, the method 400 may include determining if the third predicted battery temperature is greater than the threshold temperature. If the third predicted battery temperature is predicted to exceed the temperature threshold at an upcoming location, then it may be desired to prophylactically increase cooling to the battery to a cooling demand greater than a current cooling demand to decrease an amount of cooling used at the upcoming location while also maintaining the battery temperature below the threshold temperature.

At 427, the method 400 may include determining a confidence level, similar to 410 and 419 described above.

At 428, the method 400 may include determining if the confidence level is greater than a threshold confidence, similar to 412 and 420 described above.

At 430, the method 400 may include actuating a battery cooling system via the controller to achieve a second preemptive cooling level. In one example, the second preemptive cooling level is lower than the first preemptive cooling level. Additionally or alternatively, a timing of the second preemptive cooling level may be equal to a timing of the first preemptive cooling level. By doing this, a temperature of the battery may be maintained below the threshold temperature at the upcoming location while avoiding over-cooling the battery (e.g., decreasing the battery temperature to less than a lower threshold temperature, which is less than the threshold temperature).

Returning to 426, if the third battery temperature is not predicted to exceed the temperature threshold (e.g., less than or equal to the threshold temperature), then cooling may not be demanded at the upcoming location.

At 432, the method 400 may include not preemptively cooling the battery, similar to 414 as described above. In one example, cooling may still be desired at the upcoming location, but the amount of cooling that will be desired may be met with a coolant flow being increased and/or grille shutter position being moved to a more open position at the upcoming location independent of interior climate control.

Turning now to FIG. 5, it shows a graph 500 illustrating adjusting coolant flow rates to a battery in response to a predicted battery temperature at an upcoming location. Plot 510 illustrates if a high battery power event is occurring. Plot 520 illustrates a cooling demand for an interior cabin climate. Plot 530 illustrates a coolant flow rate for a vehicle battery. Plot 540 illustrates a desired coolant flow rate. Plot 550 illustrates a current battery temperature and plot 552 illustrates a predicted battery temperature. Sections of plot 552 may track plot 550 such that plot 552 is no longer visible. Plot 560 illustrates a battery temperature threshold, where battery temperatures exceeding the battery temperature threshold may lead to increased degradation of vehicle components. Time increases along an abscissa from a left to a right side of the figure.

Prior to t1, a high battery power event is not occurring (plot 510). The interior climate cooling is low (plot 520). The coolant flow to the vehicle battery is relatively low (plot 530) as a result of the desired coolant flow rate (plot 540). In one example, the desired coolant flow rate is based on a current battery temperature and the coolant flow rate is adjustable to match the desired coolant flow rate or to future desired coolant flow rates based on the estimated battery temperature at the upcoming location. The vehicle battery temperature is at a normal operating temperature (plot 550) not exceeding the battery temperature threshold (plot 560). As a result of a high battery power event not occurring and the desired coolant flow rate being relatively low, the vehicle battery temperature is a relatively low temperature.

At t1, a high power battery event is still not occurring.

At t2, a high battery power event is not occurring but a high battery power event is predicted to occur between t3 and t4 based on a predicted battery temperature increasing above the threshold temperature (plot 552 and dashed line plot 560, respectively). Between t2 and t3, the coolant flow rate to the battery is increased to a rate greater than a desired coolant flow rate (plot 540). As such, the battery temperature may decrease. As described above, a grille shutter position may be adjusted to adjust the battery cooling.

At t3, the high battery power event is occurring, resulting in the predicted high battery power event matching a real-world condition. Thus, model parameters may not be updated, in one example. The desired coolant flow rate and coolant flow rate may be lower than if preemptive cooling did not occur. The vehicle battery temperature is increasing as a result of the high battery power event. However, due to the preemptive cooling, the battery temperature remains below the threshold temperature. The desired coolant flow rate increases and substantially matches the coolant flow rate.

At t4, the high battery power event ends. The coolant flow rate decreases and continues to match the desired coolant flow rate. The vehicle battery temperature may decrease due to the high battery power event terminating while still receiving coolant flow. Interior climate cooling demands increase between t4 and t5, which may result in less coolant being available for battery cooling.

At t5, a high battery power event is predicted to occur at an upcoming location along a segment of a vehicle journey. The interior climate demand continues to increase to a relatively high demand. As such, the high power output event may be further associated with a high ambient temperature and/or high sun load event. Due to less coolant being available relative to the high power battery event between t3 and t4, the preemptive coolant flow between t5 and t6 may be more advanced than the preemptive coolant flow prior to t3, such that a distance and/or a time between the preemptive flow between t5 and t6 and the high power battery event is greater than the distance and/or time between the preemptive coolant flow between t2 and t3. However, a flow rate of coolant between t5 and t6 may be less than a flow rate of coolant between t2 and t3.

At t6, the high battery power event occurs and the prediction is verified. Vehicle operator cooling demand is relatively high and coolant flow is balanced between meeting the battery cooling demands and the interior climate cooling demands. By preemptively cooling the battery prior to the high power battery event, the interior climate cooling demands may continue to be met during the high battery power event. This may increase customer satisfaction.

In some examples, the grille shutters may be moved to a fully open position when the vehicle operator cooling demand is relatively high and a high power battery event occur simultaneously. The fully open position may increase battery cooling and reduce coolant flow demands at the battery.

At t7, the high battery power event ends. Coolant flow decreases and continues to match a current cooling demand. The vehicle battery temperature decreases as a result of the high battery power event ending. Interior climate cooling demand decreases, which may be caused by a plurality of conditions (e.g., weather, driver preference), increasing an available amount of coolant for the vehicle battery for future cooling events.

An embodiment of a method includes predicting a battery temperature at an upcoming location of a vehicle route, determining a confidence level of the predicted battery temperature, and preemptively adjusting heating or cooling to a battery in response to the predicted battery temperature changing and the confidence level being greater than a threshold confidence. A first example of the method further includes where predicting the battery temperature includes predicting a first battery temperature where a first level of heat transfer is provided to the battery at the upcoming location, predicting a second battery temperature where a second level of heat transfer is provided to the battery at the upcoming location, and predicting a third battery temperature where a third level of heat transfer is provided to the battery at the upcoming location, wherein the third heat transfer is less than the second heat transfer and greater than the first heat transfer. A second example of the method, optionally including the first example, further includes preemptively decreasing cooling to the battery in response to the first battery temperature being less than a threshold temperature, wherein cooling to the battery is based on a coolant temperature and flow rate, as determined by one or more of a pump speed, a valve position, a compressor speed, an active grill shutter position, and a fan speed. A third example of the method, optionally including one or more of the previous examples, further includes where preemptively increasing cooling to the battery in response to the second battery temperature being greater than a threshold temperature includes increasing cooling to the second level of heat transfer. A fourth example of the method, optionally including one or more of the previous examples, further includes where preemptively increasing cooling to the battery in response to the third battery temperature being greater than a threshold temperature includes a second preemptive cooling, wherein the second preemptive cooling demand is less than the first preemptive cooling demand and greater than the current battery cooling demand. A fifth example of the method, optionally including one or more of the previous examples, further includes heating the battery via one of more of adjusting coolant flow, changing valve position, decreasing a fan speed, changing compressor speed, adjusting a grille shutter position to a more closed position, and engaging a heating device. A sixth example of the method, optionally including one or more of the previous examples, further includes where the confidence level is based on one or more of a time and a distance to the upcoming location, a difference between the predicted battery temperature and the threshold temperature, a difference between a predicted and observed vehicle location, a difference between predicted and observed battery power, a difference between battery coolant temperature at the inlet and battery coolant temperature at the outlet and a difference between predicted and observed battery temperature. A seventh example of the method, optionally including one or more of the previous examples, further includes where the predicted battery temperature is based on data received via a plurality of onboard sensors and a cloud, wherein data to the cloud is provided by a plurality of vehicles that previously travelled through the upcoming location or a location similar to the upcoming location, wherein the location is similar to the upcoming location based on one or more of a road grade, a traffic congestion, a vehicle speed, and a speed limit. An eighth example of the method, optionally including one or more of the previous examples, further includes where the confidence level is based on a statistical variance of data from the cloud, wherein the variance is based on differences between predicted and measured values of one of more of vehicle speed, grade, wind, ambient temperature, battery temperature, battery power, climate energy and sun load at the upcoming location among similar vehicles.

An embodiment of a system of a vehicle includes a battery, an auxiliary system, a coolant system fluidly coupled to the battery and the auxiliary system, and a controller comprising instructions stored on non-transitory memory thereof that when executed enable the controller to predict a plurality of battery temperatures at an upcoming location along a vehicle journey based on feedback from a plurality of onboard sensors and data from a cloud, determine a confidence level for each of the plurality of predicted battery temperatures, and increase a cooling above a current battery cooling demand prior to reaching the upcoming location in response to one or more of the plurality of predicted battery temperatures being greater than a threshold temperature and the confidence level being greater than a threshold confidence level. A first example of the system further includes where data from the cloud includes battery temperatures from one or more vehicles travelling through the upcoming location with conditions similar to those estimated for the vehicle, wherein similarities between conditions of the one or more vehicles and the vehicle include a make, a model, manufacture data, a manufacture location, a driver age, a driver sex, a number of occupants, a battery age, a battery size, a maintenance history, a driver aggressiveness, an ambient temperature, a sun load, and an interior climate temperature. A second example of the system, optionally including the first example, further includes where the plurality of battery temperatures is predicted based on different battery heat transfer rates in combination with predicted conditions at the upcoming location. A third example of the system, optionally including one or more of the previous examples, further includes where an amount the cooling is increased is proportional to a difference between a predicted battery temperature and the threshold temperature, wherein the amount of cooling is based on a coolant temperature and flow rate, as determined by one or more of a pump speed, a valve position, a compressor speed, an active grill shutter position, and a fan speed. A fourth example of the system, optionally including one or more of the previous examples, further includes where a timing of the increase in the cooling above the current battery cooling demand is advanced in response to an interior cooling demand being relatively high. A fifth example of the system, optionally including one or more of the previous examples, further includes where the instructions further enable the controller to apply one or more updates to a model for predicting the plurality of battery temperatures, wherein one or more updates to the model are based changes to one or more of a vehicle age, vehicle hardware variations, driver behavior, and interior climate temperature.

An embodiment of a method includes predicting a battery temperature at an upcoming location of a vehicle route, determining a confidence level of the predicted battery temperature, and preemptively cooling a battery in response to the predicted battery temperature exceeding a threshold temperature and the confidence level being greater than a threshold confidence by increasing a cooling demand to a rate greater than a currently demanded battery cooling, not preemptively cooling the battery in response to the predicted battery temperature being less than or equal to the threshold temperature or the confidence level being less than the threshold confidence, and decreasing cooling to the battery in response to the predicted battery temperature being less than or equal to the threshold temperature and the confidence level being higher than the threshold confidence. A first example of the method further includes requesting a new predicted battery temperature in response to the confidence level being less than the threshold confidence. A second example of the method, optionally including the first example, further includes predicting the battery temperature includes estimating conditions at the upcoming location and assuming different heat transfer rates at the upcoming location. A third example of the method, optionally including one or more of the previous examples, further includes where a coolant system fluidly coupled to the battery is further coupled to an auxiliary system, and wherein preemptively cooling the battery includes advancing a timing of an increase in coolant flow in response to an amount of coolant flowing to the auxiliary system being relatively high. A fourth example of the method, optionally including one or more of the previous examples, further includes predicting the battery temperature based on a model customized for each individual vehicle operator of a vehicle, further comprising customizing the model based on driver aggressiveness and interior climate settings.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
predicting a battery temperature at an upcoming location of a vehicle route;
determining a confidence level of the predicted battery temperature; and
preemptively adjusting heating or cooling to a battery in response to the predicted battery temperature changing and the confidence level being greater than a threshold confidence.

2. The method of claim 1, wherein predicting the battery temperature includes predicting a first battery temperature where a first level of heat transfer is provided to the battery at the upcoming location, predicting a second battery temperature where a second level of heat transfer is provided to the battery at the upcoming location, and predicting a third battery temperature where a third level of heat transfer is provided to the battery at the upcoming location, wherein the third heat transfer is less than the second heat transfer and greater than the first heat transfer.

3. The method of claim 2, further comprising preemptively decreasing cooling to the battery in response to the first battery temperature being less than a threshold temperature, wherein cooling to the battery is based on a coolant temperature and flow rate, as determined by one or more of a pump speed, a valve position, a compressor speed, an active grill shutter position, and a fan speed.

4. The method of claim 2, wherein preemptively increasing cooling to the battery in response to the second battery temperature being greater than a threshold temperature includes increasing cooling to the second level of heat transfer.

5. The method of claim 4, wherein preemptively increasing cooling to the battery in response to the third battery temperature being greater than a threshold temperature includes a second preemptive cooling, wherein the second preemptive cooling demand is less than the first preemptive cooling demand and greater than the current battery cooling demand.

6. The method of claim 1, wherein heating further includes heating the battery via one of more of adjusting coolant flow, changing valve position, decreasing a fan speed, changing compressor speed, adjusting a grille shutter position to a more closed position, and engaging a heating device.

7. The method of claim 1, wherein the confidence level is based on one or more of a time and a distance to the upcoming location, a difference between the predicted battery temperature and the threshold temperature, a difference between a predicted and observed vehicle location, a difference between predicted and observed battery power, a difference between battery coolant temperature at the inlet and battery coolant temperature at the outlet and a difference between predicted and observed battery temperature.

8. The method of claim 1, wherein the predicted battery temperature is based on data received via a plurality of onboard sensors and a cloud, wherein data to the cloud is provided by a plurality of vehicles that previously travelled through the upcoming location or a location similar to the upcoming location, wherein the location is similar to the upcoming location based on one or more of a road grade, a traffic congestion, a vehicle speed, and a speed limit.

9. The method of claim 1, wherein the confidence level is based on a statistical variance of data from the cloud, wherein the variance is based on differences between predicted and measured values of one of more of vehicle speed, grade, wind, ambient temperature, battery temperature, battery power, climate energy and sun load at the upcoming location among similar vehicles.

10. A system of a vehicle, comprising:
a battery;
an auxiliary system;
a coolant system fluidly coupled to the battery and the auxiliary system; and
a controller comprising instructions stored on non-transitory memory thereof that when executed enable the controller to:
predict a plurality of battery temperatures at an upcoming location along a vehicle journey based on feedback from a plurality of onboard sensors and data from a cloud;
determine a confidence level for each of the plurality of predicted battery temperatures; and
increase a cooling above a current battery cooling demand prior to reaching the upcoming location in response to one or more of the plurality of predicted battery temperatures being greater than a threshold temperature and the confidence level being greater than a threshold confidence level.

11. The system of claim 10, wherein data from the cloud includes battery temperatures from one or more vehicles travelling through the upcoming location with conditions similar to those estimated for the vehicle, wherein similarities between conditions of the one or more vehicles and the vehicle include a make, a model, manufacture data, a manufacture location, a driver age, a driver sex, a number of occupants, a battery age, a battery size, a maintenance history, a driver aggressiveness, an ambient temperature, a sun load, and an interior climate temperature.

12. The system of claim 10, wherein the plurality of battery temperatures is predicted based on different battery heat transfer rates in combination with predicted conditions at the upcoming location.

13. The system of claim 10, wherein an amount the cooling is increased is proportional to a difference between a predicted battery temperature and the threshold temperature, wherein the amount of cooling is based on a coolant temperature and flow rate, as determined by one or more of a pump speed, a valve position, a compressor speed, an active grill shutter position, and a fan speed.

14. The system of claim 10, wherein a timing of the increase in the cooling above the current battery cooling demand is advanced in response to an interior cooling demand being relatively high.

15. The system of claim 10, wherein the instructions further enable the controller to apply one or more updates to a model for predicting the plurality of battery temperatures, wherein one or more updates to the model are based changes to one or more of a vehicle age, vehicle hardware variations, driver behavior, and interior climate temperature.

16. A method, comprising:
predicting a battery temperature at an upcoming location of a vehicle route;
determining a confidence level of the predicted battery temperature; and
preemptively cooling a battery in response to the predicted battery temperature exceeding a threshold temperature and the confidence level being greater than a threshold confidence by increasing a cooling demand to a rate greater than a currently demanded battery cooling;
not preemptively cooling the battery in response to the predicted battery temperature being less than or equal to the threshold temperature or the confidence level being less than the threshold confidence; and
decreasing cooling to the battery in response to the predicted battery temperature being less than or equal to the threshold temperature and the confidence level being higher than the threshold confidence.

17. The method of claim 16, further comprising requesting a new predicted battery temperature in response to the confidence level being less than the threshold confidence.

18. The method of claim 16, wherein predicting the battery temperature includes estimating conditions at the upcoming location and assuming different heat transfer rates at the upcoming location.

19. The method of claim 16, wherein a coolant system fluidly coupled to the battery is further coupled to an auxiliary system, and wherein preemptively cooling the battery includes advancing a timing of an increase in coolant flow in response to an amount of coolant flowing to the auxiliary system being relatively high.

20. The method of claim 16, further comprising predicting the battery temperature based on a model customized for each individual vehicle operator of a vehicle, further comprising customizing the model based on driver aggressiveness and interior climate settings.

* * * * *